United States Patent [19]
Purinton et al.

[11] Patent Number: 5,738,750
[45] Date of Patent: Apr. 14, 1998

[54] METHOD OF MAKING A BROADBAND COMPOSITE STRUCTURE FABRICATED FROM AN INORGANIC POLYMER MATRIX REINFORCED WITH CERAMIC WOVEN CLOTH

[75] Inventors: Donald L. Purinton; Louis R. Semff, both of Plano, Tex.

[73] Assignee: Texas Instruments Incorporated, Dallas, Tex.

[21] Appl. No.: 473,181

[22] Filed: Jun. 7, 1995

Related U.S. Application Data

[62] Division of Ser. No. 273,040, Jul. 8, 1994.

[51] Int. Cl.$^6$ ................................. D06M 17/00
[52] U.S. Cl. .................. 156/325; 156/242; 156/245; 156/285; 156/286; 156/307.1; 156/307.3; 156/324.4; 156/327; 343/872
[58] Field of Search ..................... 156/242, 245, 156/285, 286, 307.1, 307.3, 324.4, 325, 327; 252/389.31, 400.31; 501/88, 92, 95, 96; 343/872

[56] References Cited

U.S. PATENT DOCUMENTS 5,134,421   7/1992   Boyd et al. ........................... 343/872

*Primary Examiner*—Richard Weisberger
*Attorney, Agent, or Firm*—René E. Grossman; Richard L. Donaldson

[57] ABSTRACT

A structure, preferably a radome (1) which comprises a honeycomb (11) of ceramic cloth in the form of fused woven fibers bonded with a matrix to provide a ceramic fiber composite. The fibers are quartz and the matrix is a silica matrix. A cloth (13) is impregated with polysiloxane so that the cloth is 65% by weight quartz and 35% by weight polysiloxane. One or more layers of the quartz cloth (13) are disposed over both open ends of the honeycomb, the total thickness of the layers on each side of the honeycomb being 0.06 inches. A layer of a paint (15) of polysiloxane containing titanium dioxide is optionally placed over the outermost layer of the resin impregnated quartz cloth. The radome is fabricated by initially providing the honeycomb, placing the resin-impregnated cloth thereover and then heating so that some of the resin penetrates into the honeycomb and some of the resin also pyrolyzes to form holes in the resin-impregnated cloth layers. A polysilazane is then disposed in the holes that are formed to provide a sandwich wherein the outer layers or skin contain unpyrolyzed and possibly partially pyrolyzed inorganic resin.

17 Claims, 1 Drawing Sheet

METHOD OF MAKING A BROADBAND COMPOSITE STRUCTURE FABRICATED FROM AN INORGANIC POLYMER MATRIX REINFORCED WITH CERAMIC WOVEN CLOTH

This application is a Division of application Ser. No. 08/273,040 filed Jul. 8, 1994 now pending.

BACKGROUND OF THE INVENTION

1. Field of the Invention

This invention relates generally to a composite structure and, more specifically, to a broadband radome fabricated using inorganic polymers for use primarily in conjunction with missiles designed for flights of short duration during which the temperature of the radome wall is substantially elevated.

2. Brief Description of the Prior Art

Prior art broadband radomes for missiles, which have been designed primarily for one time flights of short duration, generally in the range of from about 0.5 to about 2 minutes, must have very thin skins (less than about 0.06 inches or 0.025 centimeters) in order to handle all frequencies below 18 GHz. which may be encountered. Such radomes have generally been fabricated by using polyimide resin reinforced with low dielectric (less than about 3) and low loss tangent value (less than about 0.02), generally fused silica (quartz) cloth with three to six layers of laminate for a skin or shell. The radome wall skin may comprise either a single 0.06 inch thick skin or plural skins, each skin having a thickness of up to 0.06 inches. The radome wall can also comprise two such skins spaced apart by a polyimide glass honeycomb. Wire grids for electromagnetic tuning may also be placed inside or on the surface of one or more skins of the radome. Radomes of this type have been used for the radome of the HARM missile and for other prototype missile radomes. The weakness of this design is that it is designed for applications wherein the wall temperatures generated are limited to up to about 1200° F. to 1400° F. for the contemplated short flights of about 0.5 to about 2 minutes. Such prior art missiles have also been subjected to speeds of up to about Mach 4 with the radome walls being designed to handle temperatures only up to those attained during flights of the above described types.

New generation missiles of the above described type have more stringent requirements, among these being the ability to operate for longer periods of time, the ability to operate at higher temperatures or a combination thereof. The next generation of missiles is now being designed to operate up to speeds of about Mach 6 for periods of up to about 5 minutes with the radome walls expected to encounter temperatures of about 1600° F. for an extended period of the flight with peak temperatures up to about 2300° F. for several seconds. The organic polymers used in the prior art have a problem under these conditions in that the polymer pyrolyzes and causes carbon to form at the higher temperatures to be encountered by the radomes now being designed, thereby defeating the transmissive properties required by the radomes. It is therefore apparent that improved radome materials are required for the radomes now being designed which are capable of operation over the entire flight and under the extreme temperature conditions to be encountered.

SUMMARY OF THE INVENTION

In accordance with the present invention, the above noted problems of the prior art are minimized and there is provided a composite structure, preferably a radome, which is capable of operation with adequate transmissive properties under the contemplated conditions in next generation missiles as described above. It should be understood that, though the preferred embodiment is provided with reference to a radome, the structure herein can be used for other purposes, such as, for example, printed circuit boards with metallization thereon since the shape of the final structure is determined by molding or the like. Accordingly, such other structures are contemplated by this invention.

Briefly, there is provided a radome fabricated of inorganic polymers, for the resin in the thin radome skins and honeycomb or other porous structure used in place thereof. The inorganic polymer resin is preferably a polysilicone or a polysilazane. In either case, the composite structure (resin reinforced with, for example, silica cloth) must provide a flexure strength of at least about 5000 psi through a temperature range up to about 2000° F. In addition, it is important that at these temperatures pyrolysis does not result in the formation of free elemental carbon when conducted in the presence of oxygen (air).

In general, any polysilicone or polysilazane which provides the above described properties, can be provided in a flowable form at fabrication temperatures and which under elevated temperature polymerizes and converts from the flowable form to a solid state would be appropriate and could be used in accordance with the present invention.

The inorganic polymer replaces the polyimide resin of the prior art for the matrix in the silica woven cloth laminate. Such polymer resin can also be used in conjunction with the silica honeycomb and for the adhesives bonding the radome and its parts together. For the honeycomb, fused silica fiber cloth, aluminum silicate fiber cloth or a cloth fabricated from fibers containing a combination of silica and alumina or individual fibers of each can be used in place of the borosilicate glass cloth of the prior art to provide improved temperature capability. Depending upon the final cure temperature of the radome or its parts, the inorganic polymer resin will be retained in a polymer state which is resilient with the degree of resiliency decreasing with increased polymerization and be pyrolyzed into a ceramic state or result in a combination of the two states due to partial pyrolysis. Initially the polymer is in a flowable form whereas at about 600° C. the polymer will pyrolyze to silicon dioxide in the case of polysilicones and at 900° C. to silicon nitride in the case of polysilazanes. For example, the radome can be fabricated using a polysiloxane resin and cured at 400° to 500° F. However,if the final cure is held at 1200° F. or above for a sufficient period of time, the polymer resin is pyrolyzed to a ceramic (silica) and the composite is esentially all ceramic, capable of withstanding high temperatures. However, the radome laminate matrix, when in a polymer state, remains resilient. An equivalent transition occurs with polysilazane to silicon nitride. One can take advantage of these processes for radomes by retaining the radome in a state between the polymer resin and ceramic extremes and obtain a toughness associated with the polymer resin and high temperature resistance associated with the ceramic material. Another approach is to retain the radome totally in the polymer resin state to obtain toughness for handling. A very high temperature flight would partially or completely convert the polymer resin into a ceramic without a detrimental effect upon radome performance.

The radome wall comprises a honeycomb of ceramic cloth in the form of woven fibers bonded together with inorganic polymers to provide a ceramic fiber composite. The fibers are preferably silica and the resin is preferably a polysiloxane, a polysilazane or a combination product using the two resins. The cloth is impregated with from about 25% to about 60% by weight and preferably 35% by weight of the inorganic resin. From 3 to 10 and preferably four layers of quartz cloth impregated with from about 25 to about 60% and preferably 35% by weight of an above mentioned polysiloxane and/or polysilazane is used to make each layer (skin), the total thickness of each layer on each side of the honeycomb being up to about 0.06 inches. The final total thickness of the layers is limited only by the final transmissive properties required of the radome wall. A layer of filled or non-filled inorganic polymer, preferably polysiloxane and/or polysilazane can optionally be placed over the outermost layer of the radome as a protective paint. Also, other conventional paints may be used alone or in combination with the inorganic polymer paint.

The radome, if fabricated utilizing a combination of the two resins, would initially provide a honeycomb, placing one or more layers of the polysiloxane resin-impregnated cloth over opposing surfaces of the honeycomb and then heating so that, initially, some of the resin penetrates into the honeycomb and later the resin pyrolyzes and the resin-impregnated cloth layers become porous. A different resin having different properties, such as a polysiloxane or polysilazane, is then disposed in the porous material that has formed to provide a sandwich. This resin can be processed to a polymerized, pyrolyzed or partially pyrolyzed state. The honeycomb can be replaced by any porous structure such as, for example, a resin foam, preferably a polysiloxane foam or a ceramic foam.

It can be seen that, if any carbon is initially present in the polysiloxane inorganic polymer, pyrolysis in air of the inorganic polymer results in the formation of a carbon-free ceramic material, namely silica. It can also be seen that an initial carbon-free polysiloxane or polysilazane can function for fabrication with or without the pyrolysis in air step required to remove carbon. With each material, a rigid structure at elevated temperature and a capability of transmission of frequencies up to 18 GHz is required. No elemental carbon formation is present to impair the transmissive properties of the radome as in the prior art.

DESCRIPTION OF THE PREFERRED EMBODIMENT

Figure 1:
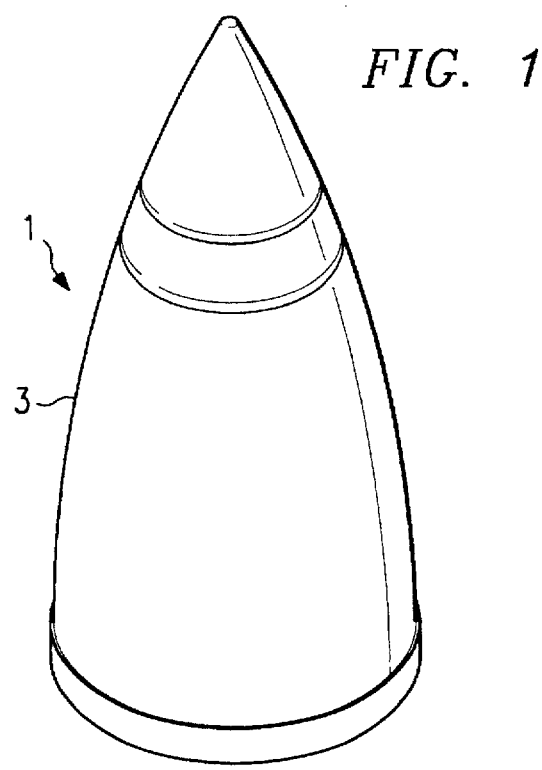
FIG. 1 is an elevational view of a radome.

Referring first to FIG. 1, there is shown a typical radome 1 which, in accordance with the present invention, has a wall 3 which is fabricated using an inorganic polymer matrix reinforced with glass or ceramic woven cloth.

Figure 2:
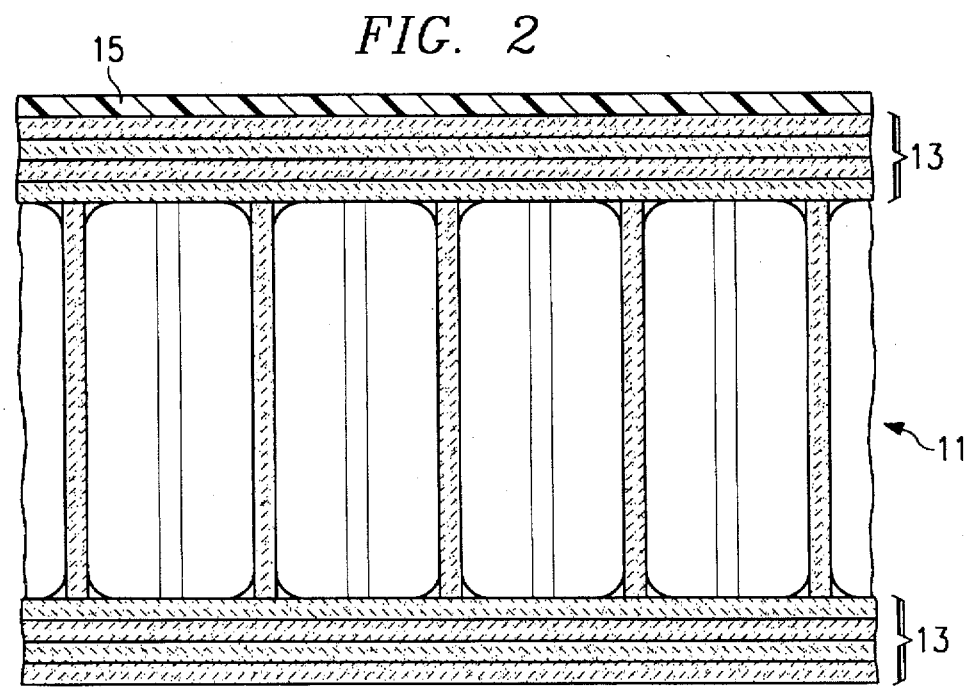
FIG. 2 is a cross sectional view of a portion of the wall of the radome of FIG. 1 in accordance with the present invention.

Referring now to FIG. 2, there is shown a cross section of a portion of the wall 3 of the radome 1 of FIG. 1. The radome comprises a honeycomb 11 of ceramic cloth in the form of fused woven fibers bonded with a matrix to provide a ceramic fiber composite. The fibers are quartz and the matrix is a silica matrix. A cloth 13 is impregated with a polysiloxane having the properties described hereinabove, such as BP Chemicals SM8000, so that the cloth is 65% by weight quartz and 35% by weight polysiloxane. Four layers of the quartz cloth 13 are disposed over both open ends of the honeycomb, the total thickness of each of the layers on each side of the honeycomb being less than 0.06 inches. A layer of a paint 15 of polysiloxane or polysilazane and a polytetrafluoroethylene layer is placed over the outermost layer of the resin impregnated quartz cloth. The radome is fabricated by initially providing the honeycomb 11, placing the resin-impregnated cloth 13 thereover and then heating so that some of the resin penetrates into the honeycomb and, with further heating, the resin pyrolyzes to form holes in the resin-impregnated cloth layers. A polysilazane having the above described properties is then disposed in the holes that are formed to provide a sandwich wherein the outer layers or skin contain unpyrolyzed polysilazane and partially pyrolyzed polysiloxane. The structure is appropriately shaped in the desired final structure, in the present case the shape being that of a radome.

Though the invention has been described with respect to a specific preferred embodiment thereof, many variations and modifications will immediately become apparent to those skilled in the art. It is therefore the intention that the appended claims be interpreted as braodly as possible in view of the prior art to include all such variation and modification.

We claim:

1. A method of making a radome structure comprising the steps of:
   (a) providing a shaped wall having a flexure strength of at least about 5000 psi through a temperature range up to about 2000° F. and being substantially free of elemental carbon formation in the presence of oxygen at temperatures up to about 2000° F. by the steps of:
      (i) providing a central region of porous material comprising a ceramic material with a pair of opposing exterior surfaces with an inorganic resin;
      (ii) providing a skin to form a composite structure by impregnating a first cloth of ceramic material with an inorganic resin which, under pyrolysis, provides an elemental carbon-free material and, with increased temperature, gradually converts from the liquid state to a resilient state and then to a solid state by about 1200° F.; and
      (iii) overlying said skin over each of said opposing surfaces.

2. The method of claim 1 wherein said porous material is one of a honeycomb or a second cloth.

3. The method of claim 1 wherein said porous material is a foam.

4. The method of claim 2 wherein said one of a honeycomb or second cloth is composed of one of silicon dioxide, aluminum oxide or aluminum silicate and said inorganic resin is one of a polysilicone, a polysilazane or a combination product of a polysilicone and a polysilazane.

5. The method of claim 3 wherein said one of a honeycomb or second cloth is composed of one of silicon dioxide, aluminum oxide or aluminum silicate and said inorganic resin is one of a polysilicone, a polysilazane or a combination product of a polysilicone and a polysilazane.

6. The method of claim 1 wherein said skin is composed of one of silicon dioxide, aluminum oxide or aluminum silicate and said inorganic resin is one of a polysilicone, a polysilazane or a combination product of a polysilicone and a polysilazane.

7. The method of claim 2 wherein said skin is composed of one of silicon dioxide, aluminum oxide or aluminum silicate and said inorganic resin is one of a polysilicone, a polysilazane or a combination product of a polysilicone and a polysilazane.

8. The method of claim 3 wherein said skin is composed of one of silicon dioxide, aluminum oxide or aluminum silicate and said inorganic resin is one of a polysilicone, a polysilazane or a combination product of a polysilicone and a polysilazane.

9. The method of claim 4 wherein said skin is composed of one of silicon dioxide, aluminum oxide or aluminum silicate and said inorganic resin is one of a polysilicone, a polysilazane or a combination product of a polysilicone and a polysilazane.

10. The method of claim 5 wherein said skin is composed of one of silicon dioxide, aluminum oxide or aluminum silicate and said inorganic resin is one of a polysilicone, a polysilazane or a combination product of a polysilicone and a polysilazane.

11. The method of claim 1 wherein the weight of said inorganic resin is from about 25 to about 60% of the weight of said skin.

12. The method of claim 6 wherein the weight of said inorganic resin is from about 25 to about 60% of the weight of said skin.

13. The method of claim 7 wherein the weight of said inorganic resin is from about 25 to about 60% of the weight of said skin.

14. The method of claim 8 wherein the weight of said inorganic resin is from about 25 to about 60% of the weight of said skin.

15. The method of claim 9 wherein the weight of said inorganic resin is from about 25 to about 60% of the weight of said skin.

16. The method of claim 10 wherein the weight of said inorganic resin is from about 25 to about 60% of the weight of said skin.

17. A method of using a radome structure comprising the steps of:
(a) providing a shaped wall having a flexure strength of at least about 5000 psi through a temperature range up to about 2000° F. and being substantially free of elemental carbon formation in the presence of oxygen at temperatures up to about 2000° F. by the steps of:
(i) providing a central region of porous material comprising a ceramic material with a pair of opposing exterior surfaces with an inorganic resin;
(ii) providing a skin to form a composite structure by impregnating a first cloth of ceramic material with an inorganic resin which, under pyrolysis, provides an elemental carbon-free material and, with increased temperature, gradually converts from the liquid state to a resilient state and then to a solid state by about 1200° F.; and
(iii) overlying said skin over each of said opposing surfaces; and
(b) subjecting said shaped wall to temperatures of about 1600° F. for a finite period up to about 5 minutes and a peak temperature of about 2300° F. with release of substantially no elemental carbon from said wall.

* * * * *